United States Patent
Huang et al.

(10) Patent No.: US 9,161,093 B2
(45) Date of Patent: Oct. 13, 2015

(54) CORDLESS MULTIMEDIA SYSTEM AND IMAGE DISPLAY SYSTEM

(75) Inventors: Jia-Bin Huang, Taipei (TW);
Cheng-Pang Yeng, Kao-Hsiung (TW)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 1390 days.

(21) Appl. No.: 11/427,344

(22) Filed: Jun. 29, 2006

(65) Prior Publication Data
US 2007/0006269 A1  Jan. 4, 2007

(30) Foreign Application Priority Data
Jun. 30, 2005 (TW) ................................ 94122074 A

(51) Int. Cl.
*H04N 7/20* (2006.01)
*H04N 7/18* (2006.01)
*H04N 7/173* (2011.01)
*H04N 7/16* (2011.01)
*H04N 21/61* (2011.01)

(52) U.S. Cl.
CPC ........... *H04N 21/6131* (2013.01); *H04N 7/183* (2013.01); *H04N 21/6181* (2013.01)

(58) Field of Classification Search
CPC ................... H04N 21/6131; H04N 21/6181
USPC .................... 725/81, 100, 120, 131, 151, 139
See application file for complete search history.

(56) References Cited

U.S. PATENT DOCUMENTS

| | | | |
|---|---|---|---|
| 5,657,089 A * | 8/1997 | Onagawa | 348/537 |
| 6,014,121 A * | 1/2000 | Aratani et al. | 345/89 |
| 6,317,802 B1 | 11/2001 | Inamine | |
| 6,373,827 B1 | 4/2002 | Tayebi et al. | |
| 6,542,149 B1 | 4/2003 | Chung | |
| 6,879,581 B1 | 4/2005 | Leung | |
| 7,317,451 B2 * | 1/2008 | Kim | 345/204 |
| 7,471,340 B1 * | 12/2008 | Chowdhury et al. | 348/572 |
| 2005/0289631 A1 * | 12/2005 | Shoemake | 725/118 |
| 2006/0209745 A1 * | 9/2006 | MacMullan et al. | 370/328 |

FOREIGN PATENT DOCUMENTS

| | | |
|---|---|---|
| TW | 486662 | 5/2002 |
| TW | 530226 | 5/2003 |
| TW | 536893 | 6/2003 |
| TW | 578095 | 3/2004 |

* cited by examiner

*Primary Examiner* — Gigi L Dubasky
(74) *Attorney, Agent, or Firm* — McClure, Qualey & Rodack, LLP

(57) ABSTRACT

A multimedia system includes a data source for providing a multimedia data; a wireless transmitting module, coupled to the data source, comprising a wireless transmitter for transmitting the multimedia data; a wireless receiving module comprising a wireless receiver for receiving the multimedia data from the wireless transmitter; and a reproducing device, coupled to the wireless receiving module, for reproducing the multimedia data received by the wireless receiver.

20 Claims, 5 Drawing Sheets

CORDLESS MULTIMEDIA SYSTEM AND IMAGE DISPLAY SYSTEM

BACKGROUND OF THE INVENTION

1. Field of the Invention

The present invention relates to wireless transmission techniques, and more particularly, to multimedia data wireless communication means.

2. Description of the Prior Art

With the rapid development of information techniques and multimedia applications, more and more image or audio data must be processed by the computer. In general, the multimedia data, including the image and audio data, processed by the computer is applied to a reproducing device through a cable. For example, the image data output from a graphic card of the computer is usually outputted through a D-sub interface (e.g. VGA port) and then transmitted to a display device for displaying via a transmission cable.

Recently, the display device is often provided with a Digital Visual Interface (DVI) or a High-Definition Multimedia Interface (HDMI) for use in improving the image quality. Unfortunately, the transmission cables for these interfaces are quite costly. Moreover, the conventional wired transmission means may easily cause inconvenience in practical applications.

SUMMARY OF THE INVENTION

It is therefore an objective of the claimed invention to provide a multimedia system for transmitting and receiving multimedia data through a wireless communication module.

An exemplary embodiment of a multimedia system is disclosed comprising: a data source for providing a multimedia data; a wireless transmitting module, coupled to the data source, comprising a wireless transmitter for transmitting the multimedia data; a wireless receiving module comprising a wireless receiver for receiving the multimedia data from the wireless transmitter; and a reproducing device, coupled to the wireless receiving module, for reproducing the multimedia data received by the wireless receiver.

An exemplary embodiment of a method for playing an multimedia data is disclosed comprising: generating a multimedia data from by using a data source; transmitting the multimedia data according to using an ultra wideband (UWB) protocol to transmit the multimedia data; receiving the transmitted multimedia data in accordance with the UWB protocol to receive the transmitted multimedia data; and playing the received multimedia data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
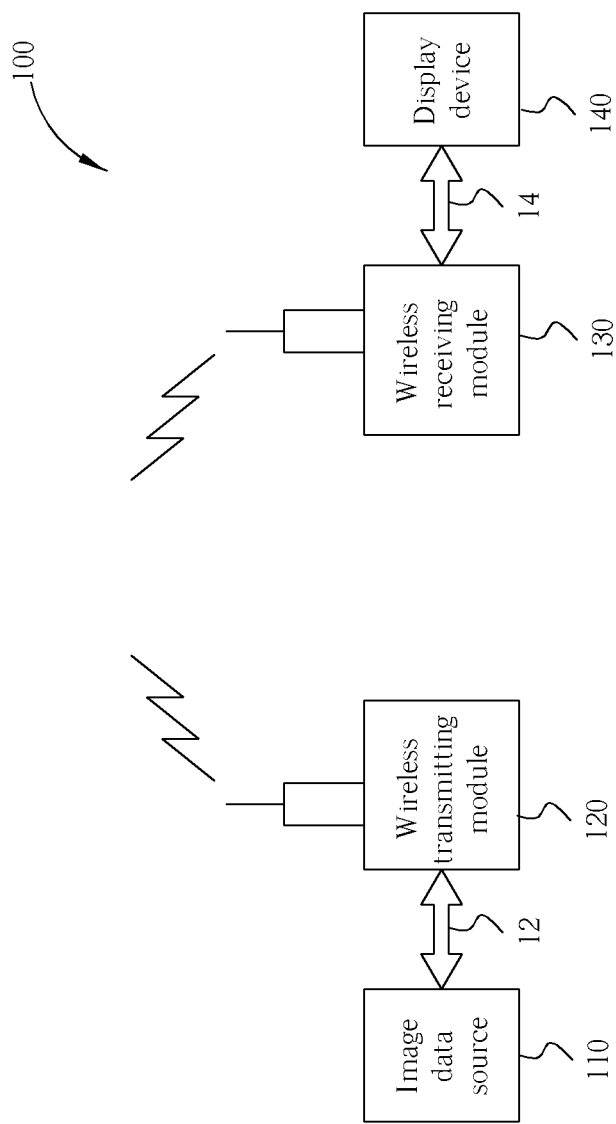
FIG. 1 is a block diagram of a multimedia system according to one embodiment of the present invention.

Please refer to FIG. 1, which shows a block diagram of a multimedia system 100 according to one embodiment of the present invention. The multimedia system 100 comprises an image data source 110 for providing an image data. In this embodiment, the image data source 110 is a personal computer with a graphic processing unit (GPU) or a graphic card for processing image data. The multimedia system 100 further comprises a wireless transmitting module 120 for transmitting the image data utilizing an ultra wideband (UWB) wireless communication means; a wireless receiving module 130 for receiving the multimedia data from the wireless transmitting module 120 according to the UWB wireless communication standard; and a display device 140 for reproducing the image data transmitted from the image data source 110 through the wireless transmitting module 120 and the wireless receiving module 130. In this embodiment, the display device 140 is a CRT monitor or a flat monitor, such as a LCD monitor or a PDP monitor. In other words, the multimedia system 100 in this embodiment is an image display system.

To be compatible with the mainstream applications, both the wireless transmitting module 120 and the wireless receiving module 130 of this embodiment are a stand-alone device, wherein the wireless transmitting module 120 communicates with the image data source 110 via a D-sub analog interface 12 while the wireless receiving module 130 communicates with the display device 140 via a D-sub analog interface 14. It should be appreciated by those of ordinary skill in the art that, instead of the D-sub analog interface, digital interfaces such as a Digital Visual Interface (DVI) or a High-Definition Multimedia Interface (HDMI) or other interfaces may be employed to interconnect each of the wireless modules 120 and 130 with other components. Additionally, the wireless transmitting module 120 and the wireless receiving module 130 can be integrated within the image data source 110 and the display device 140, respectively, and are not limited to the stand-alone devices.

It should also be noted that the image data source 110 and the display device 140 are assumed a combination of a personal computer and a monitor in this embodiment. This is merely for the purpose of explanatory convenience rather than a restriction of the practical applications. For example, the image data source 110 and the display device 140 may be a combination of a laptop and a projector, an optical storage reproducing device (e.g., a DVD player) and a television, a surveillance camera and a surveillance monitor, or any other combination of a multimedia data source and a multimedia reproducing device. In the following descriptions, the image data source 110 and the display device 140 are also assumed the combination of the personal computer and the monitor.

Figure 2:
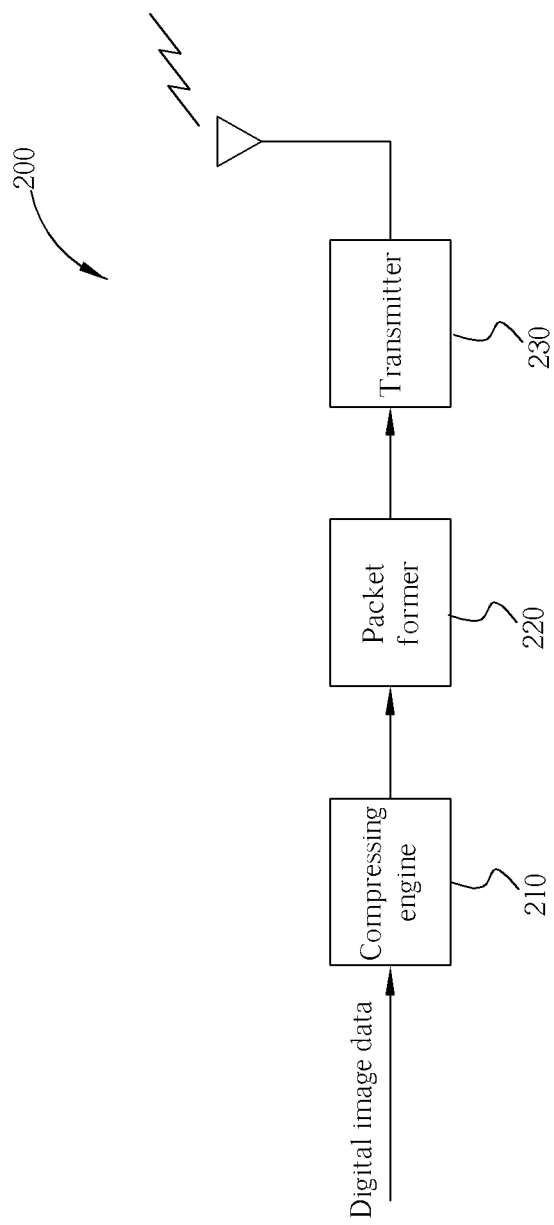
FIG. 2 is a block diagram of a wireless transmitting module of FIG. 1 according to a first embodiment of the present invention.

FIG. 2 is a block diagram of a wireless transmitting module 200 being a first embodiment of the wireless transmitting module 120. As shown, the wireless transmitting module 200 comprises a compressing engine 210, a packet former 220, and a transmitter 230. In the embodiment shown in FIG. 2, the connecting interface 12 is assumed a digital interface such as a DVI or a HDMI and the multimedia data is a digital image data. To fully utilize the bandwidth of the UWB communication, the compressing engine 210 compresses the image data transmitted from the image data source 110 through the digital interface 12 to reduce the data amount to be transmitted. The packet former 220 packetizes the compressed image data from the compressing engine 210 to generate data packets complying with the UWB communication standard. Subsequently, the transmitter 230 transmits the data packets through the UWB wireless channels. In this embodiment, the transmitter 230 is a UWB physical layer (PHY) circuit.

It should be noted, to reduce packet miss or damage during the compression of the image data, a lossless entropy coding, such as the Hoffman Coding and the Arithmetic Coding, or the LZ77/LZ78 compressing algorithm may be adopted by the compressing engine 210 to obtain a compressing ratio of 25%~30%. In practice, to compress the image data is merely a preferred implementation rather than a restriction of the present invention.

Figure 3:
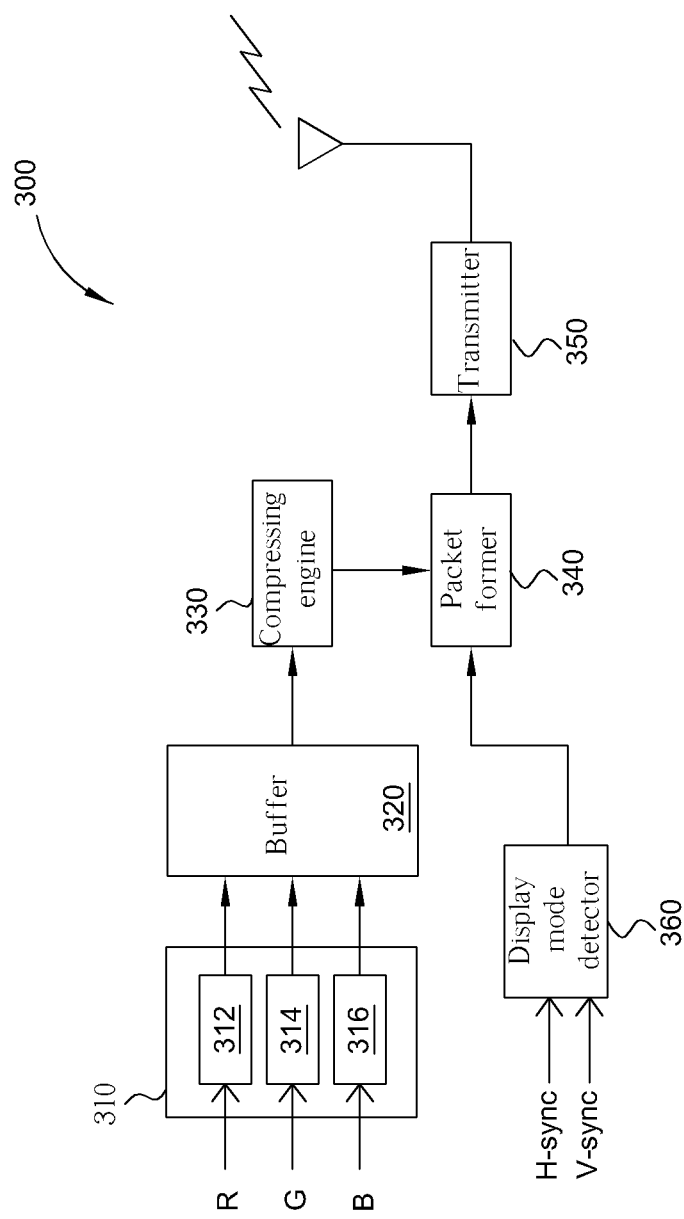
FIG. 3 is a block diagram of a wireless transmitting module of FIG. 1 according to a second embodiment of the present invention.

FIG. 3 shows a block diagram of a wireless transmitting module 300 being a second embodiment of the wireless transmitting module 120. This embodiment is feasible for the connecting interface 12 being an analog interface such as a D-sub interface. As shown in FIG. 3, the wireless transmitting module 300 comprises an analog-to-digital converting module (ADC module) 310, a compressing engine 330, a packet former 340, and a transmitter 350. The ADC module 310 is arranged for converting the analog image data into a digital format. In this embodiment, the ADC module 310 comprises three analog-to-digital converters (ADCs) 312, 314, and 316 for converting the R, G, and B signals of the analog image data, respectively, to form a digital image data. In practice, a buffer 320 may be arranged between the ADC module 310 and the compressing engine 330 for buffering data. Subsequently, the compressing engine 330 compresses the digital image data and transmits compressed digital image data to the packet former 340. The following operations of the packet former 340 and the transmitter 350 are substantially the same as the packet former 220 and the transmitter 230, repeated descriptions are therefore omitted for brevity.

The analog image data comprises H-sync signals and V-sync signals. In a preferred embodiment, the wireless transmitting module 300 further comprises a display mode detector 360 for deciding the sampling frequency of the ADCs 312, 314, and 316 according to the H-sync signals and V-sync signals. In another embodiment, the display mode detector 360 further determines the refresh rate and resolution of the pictures corresponding to the image data. The packet former 340 may record the determination results obtained by the display mode detector 360 in the packets so that the wireless receiving module 130 can perform data synchronization accordingly.

Figure 4:
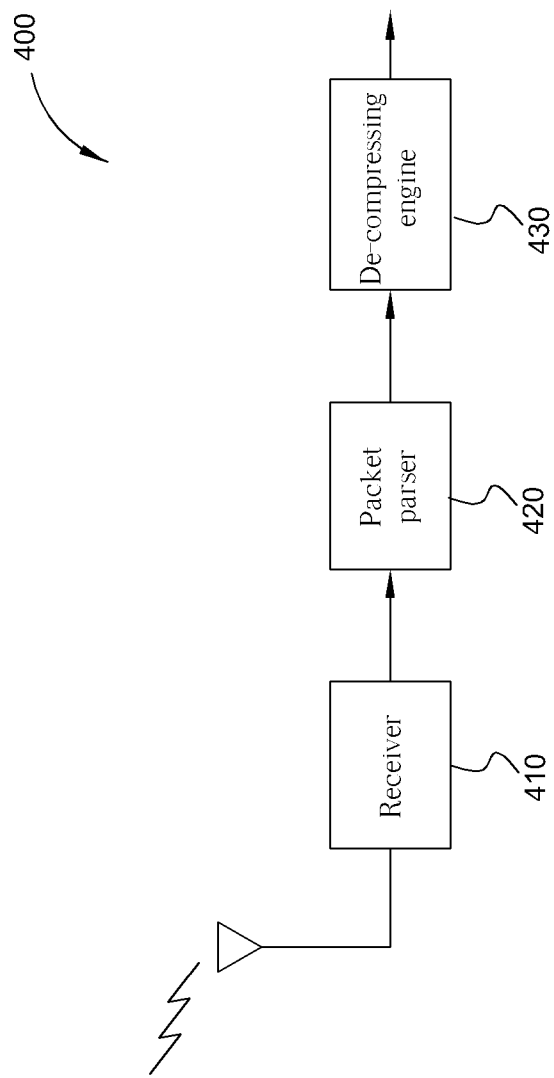
FIG. 4 is a block diagram of a wireless receiving module of FIG. 1 according to a first embodiment of the present invention.

FIG. 4 shows a block diagram of a wireless receiving module 400 being a first embodiment of the wireless receiving module 130. In this embodiment, the connecting interface 14 is assumed a digital interface such as a DVI or a HDMI while the display device 140 is a digital display device, such as a LCD monitor. As shown in FIG. 4, the wireless receiving module 400 comprises a receiver 410 for receiving UWB packets transmitted from the wireless transmitting module 120; a packet parser 420 for parsing compressed data with the packets received by the receiver 410; and a de-compressing engine 430 for de-compressing the compressed data. Since the connecting interface 14 is a digital interface, the de-compressing engine 430 can directly transmit de-compressed digital image data to the display device 140 through the connecting interface 14.

Figure 5:
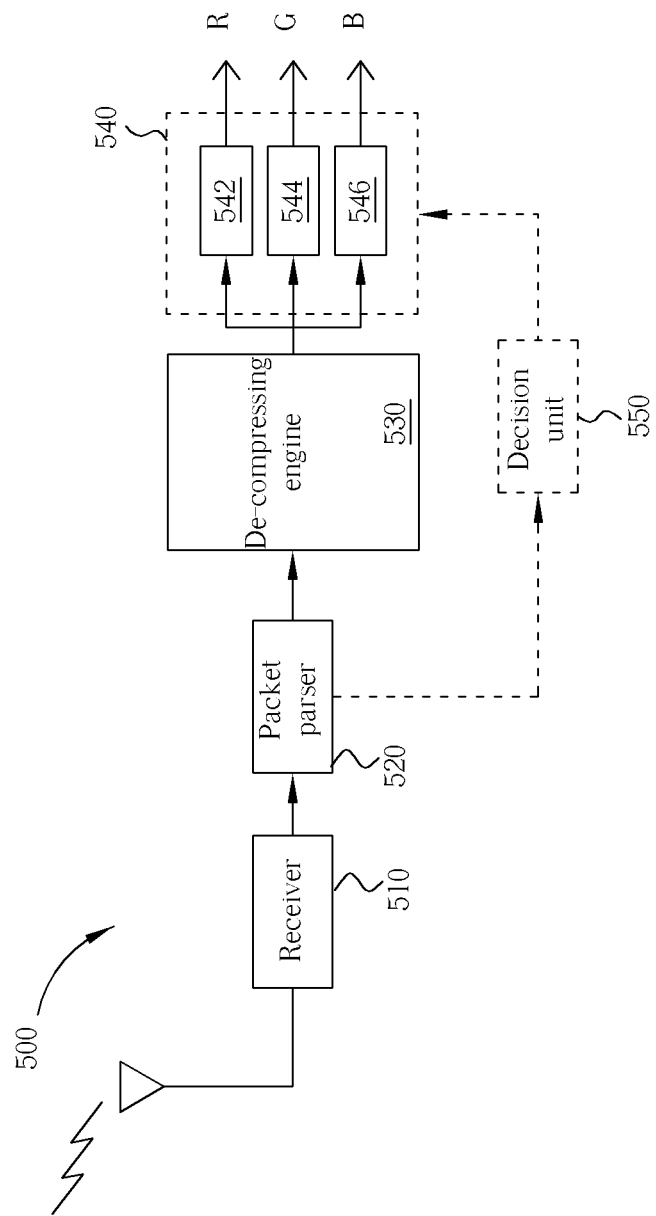
FIG. 5 is a block diagram of a wireless receiving module of FIG. 1 according to a second embodiment of the present invention.

FIG. 5 is a block diagram of a wireless receiving module 500 being a second embodiment of the wireless receiving module 130. In this embodiment, the connecting interface 14 is assumed an analog interface such as a D-sub interface and the display device 140 is an analog display device such as a CRT monitor. AS shown in FIG. 5, the wireless receiving module 500 comprises a receiver 510, a packet parser 520, a de-compressing engine 530, and a digital-to-analog converting module (DAC module) 540. The receiver 510, the packet parser 520, and the de-compressing engine 530 are similar to the aforementioned the receiver 410, the packet parser 420, and the de-compressing engine 430, respectively, and further details are therefore omitted. The DAC module 540 is arranged for converting the digital signal from the de-compressing engine 430 into an analog format. In this embodiment, the DAC module 540 comprises three digital-to-analog converters (DACs) 542, 544, and 546 for converting the R, G, and B signals of the digital signal into an analog format, respectively, to form an analog image signal. As a result, the analog image signal can be applied to the display device 140 through the connecting interface 14.

In a preferred embodiment, if the packets received by the receiver 510 comprises the refresh rate and resolution of the pictures corresponding to the analog image data, the packet parser 520 extracts the refresh rate and resolution from the packets to decide the sampling frequency of the DACs 542, 544, and 546. In another embodiment, the wireless receiving module 500 further comprises a decision unit 550 for generating corresponding H-sync signals and V-sync signals according to the extracted refresh rate and resolution. The H-sync signals and V-sync signals are then transmitted to the display device 140 from the decision unit 550 via the connecting interface 14.

According to the foregoing descriptions, the connecting cable between a personal computer and a monitor is no longer required by directly connecting the wireless transmitting module 120 to the output port of a graphic card of the computer and by directly connecting the wireless receiving module 130 to the input port of the monitor. In such a configuration, the computer can transmit images to the monitor through the UWB wireless communications without any connecting cable. In addition, the CPU of the computer can support the accelerating processes of image data due to the wireless transmitting module 120 being directly connected to the output port of the graphic card of the computer. The bandwidth of the UWB communications exceeds 500 MHz, so that the quality of image data received by the display device through the wireless receiving module 130 is as good as that received through the conventional cable. In other words, the wireless communication means disclosed above will not deteriorate the image quality of the multimedia system 100.

In the foregoing embodiments, the image transmission applications of the multimedia system 100 are described. This is merely for the purpose of explanatory convenience rather than a limitation of the practical applications. The disclosed architectures can also be applied to other multimedia data such as audio data or the like. As mentioned previously, the image data source 110 can be implemented with other multimedia data source and the display device 140 can be realized by other multimedia reproducing device. For example, in the applications of audio data transmission, the image data source 110 may be an audio data source such as an audio CODEC while the display device 140 may be an audio reproducing device such as a speaker. Those of ordinary skilled in the art can easily realize such an application according to the disclosure of the present invention.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A multimedia system comprising:
   a data source for providing a multimedia data;
   a wireless transmitting module, coupled to the data source, comprising a wireless transmitter for transmitting the multimedia data, a detector, and an analog-to digital converter,
   the analog-to-digital converter being utilized for converting the multimedia data from an analog format to a digital format,
   the detector being configured to determine a sampling rate of the analog-to-digital converter according to a vertical synchronization signal or a horizontal synchronization signal;
   a packet former configured to generate packets according to the sampling rate determined by the detector and the multimedia data;
   a wireless receiving module comprising a wireless receiver for receiving the multimedia data from the wireless transmitter; and
   a reproducing device, coupled to the wireless receiving module, for reproducing the multimedia data received by the wireless receiver.

2. The system of claim 1, wherein the multimedia data comprises at least one of image data and audio data.

3. The system of claim 1, wherein the wireless transmitting module comprises:
   a compressing engine for compressing the multimedia data from the data source.

4. The system of claim 3, wherein the compressing engine utilizes lossless entropy coding to compress the multimedia data.

5. The system of claim 1, wherein the detector is a display mode detector and the wireless receiving module receives the packets and performs data synchronization according to information within the packets.

6. The system of claim 1, wherein the packet former is coupled between the wireless transmitter and the data source and is configured to generate packets complying with an ultra wideband (UWB) transmission standard according to the multimedia data.

7. The system of claim 6, wherein the detector is a display mode detector for generating information according to at least one of the vertical synchronization signal and the horizontal synchronization signal; and
   the packet former further records the information in the packets, so that the wireless receiving module performs data synchronization accordingly.

8. The system of claim 7, wherein the multimedia data transmitted by the wireless transmitter comprises at least one of a refresh rate and a resolution of an image data of the multimedia data.

9. The system of claim 8, wherein the receiving module comprises:
   a packet parser coupled between the wireless receiver and the reproducing device for extracting the at least one of the refresh rate and the resolution from the packets transmitted by the wireless transmitter.

10. The system of claim 6, wherein the receiving module comprises:
    a packet parser coupled between the wireless receiver and the reproducing device for extracting the multimedia data from the packets transmitted by the wireless transmitter.

11. The system of claim 1, wherein the data source has an interface coupled to the wireless transmitting module, wherein the interface is one of a D-sub analog interface, a Digital Visual Interface (DVI), and a High-Definition Multimedia Interface (HDMI).

12. The system of claim 1, wherein the wireless transmitter comprises an ultra wideband (UWB) PHY circuit.

13. The system of claim 1, wherein the transmitted multimedia data comprises an information corresponding to the multimedia data and the wireless receiving module comprises a digital-to-analog converter (DAC) for sampling the transmitted multimedia data according to the information of the multimedia data.

14. The system of claim 13, wherein the information comprises at least one of a refresh-rate and a resolution of an image data of the multimedia data.

15. The system of claim 1, wherein the data source is a computer and the reproducing device is a monitor.

16. The system of claim 1, wherein the data source is an optical storage reproducing device and the reproducing device is a television.

17. A method for playing an multimedia data, the method comprising:
    generating a multimedia data by using a data source;
    deciding a sampling rate of an analog-to-digital converter according to a vertical synchronization signal or a horizontal synchronization signal;
    using the analog-to-digital converter to convert the multimedia data from an analog format to a digital format;
    transmitting the multimedia data according to an ultra wideband (UWB) protocol;
    receiving the transmitted multimedia data in accordance with the UWB protocol; and
    playing the received multimedia data.

18. The method of claim 17, further comprising: compressing the multimedia data from the data source according to lossless entropy coding.

19. The method of claim 17, wherein the transmitted multimedia data comprises an information corresponding to the multimedia data, and the method further comprises: sampling the transmitted multimedia data according to the information of the multimedia data to generate the received multimedia data.

20. A multimedia system comprising:
    a wireless transmitting module coupled to a data source and configured to transmit multimedia data, the wireless transmitting module comprising:
    an analog-to digital converter configured to convert the multimedia data from an analog format to a digital format;
    a detector configured to determine information comprising: a sampling rate of the analog-to-digital converter, a refresh rate, and a picture resolution of the multimedia data; and
    a packet former configured to generate packets according to the multimedia data and the information determined by the detector;
    a wireless receiving module comprising a wireless receiver for receiving the packets from the wireless transmitter; and
    a reproducing device, coupled to the wireless receiving module, for reproducing multimedia data according to the information and multimedia data in the received packets.

* * * * *